(12) United States Patent
Shimoda et al.

(10) Patent No.: US 10,957,893 B2
(45) Date of Patent: Mar. 23, 2021

(54) TERMINAL FITTING AND WIRING MODULE USING SAME

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroki Shimoda, Mie (JP); Shinichi Takase, Mie (JP); Nobuyuki Matsumura, Mie (JP); Taiji Yanagida, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/318,898

(22) PCT Filed: Jul. 5, 2017

(86) PCT No.: PCT/JP2017/024655
§ 371 (c)(1),
(2) Date: Jan. 18, 2019

(87) PCT Pub. No.: WO2018/016319
PCT Pub. Date: Jan. 25, 2018

(65) Prior Publication Data
US 2019/0189996 A1 Jun. 20, 2019

(30) Foreign Application Priority Data
Jul. 21, 2016 (JP) .............................. JP2016-143633

(51) Int. Cl.
*H01M 2/20* (2006.01)
*H01M 2/10* (2006.01)
(Continued)

(52) U.S. Cl.
CPC ............. *H01M 2/206* (2013.01); *H01M 2/10* (2013.01); *H01M 2/20* (2013.01); *H01R 11/288* (2013.01);
(Continued)

(58) Field of Classification Search
CPC ..... H01M 2/20–266; H01M 2/30; H01M 2/10
See application file for complete search history.

(56) References Cited

U.S. PATENT DOCUMENTS 8,388,382 B2 * 3/2013 Ikeda .................. H01M 10/482
439/627
2011/0159350 A1 * 6/2011 Ochi .................... H01M 2/1077
429/159
(Continued)

FOREIGN PATENT DOCUMENTS

JP 55-180276 12/1980
JP 57-80788 5/1982
(Continued)

OTHER PUBLICATIONS

JP-2012059500-A English Machine Translation (Year: 2020).*
(Continued)

*Primary Examiner* — Ula C Ruddock
*Assistant Examiner* — Armindo Carvalho, Jr.
(74) *Attorney, Agent, or Firm* — Greenblum & Bernstein, P.L.C.

(57) ABSTRACT

Provided is a terminal fitting for connecting, in an electric storage module that has a plurality of electricity storage elements, a wire to an electrode terminal of each of the electricity storage elements, the terminal fitting including: a
(Continued)

plate-shaped terminal connection portion that is to be connected to the electrode terminal; an extending portion extending integrally from an edge portion of the terminal connection portion; and a wire connection portion for connecting the wire, the wire connection portion being provided on a distal end side of the extending portion, wherein the extending portion is inclined to be higher toward a distal end such that a side thereof on the wire connection portion is raised relative to a plate surface of the terminal connection portion.

10 Claims, 9 Drawing Sheets

(51) Int. Cl.
*H01R 11/28* (2006.01)
*H01R 11/12* (2006.01)
*H01R 4/18* (2006.01)
*H01R 4/30* (2006.01)

(52) U.S. Cl.
CPC ......... *H01M 2220/20* (2013.01); *H01R 4/185* (2013.01); *H01R 4/30* (2013.01); *H01R 11/12* (2013.01)

(56) References Cited

U.S. PATENT DOCUMENTS

| | | | |
|---|---|---|---|
| 2012/0015550 A1 | 1/2012 | Ikeda et al. | |
| 2012/0208410 A1 | 8/2012 | Ikeda et al. | |
| 2012/0244759 A1 | 9/2012 | Tsuji | |
| 2013/0010449 A1* | 1/2013 | Ikeda | H02G 3/0437 361/826 |
| 2015/0086819 A1 | 3/2015 | Ogasawara et al. | |
| 2016/0197330 A1 | 7/2016 | Takase et al. | |

FOREIGN PATENT DOCUMENTS

| | | |
|---|---|---|
| JP | 2011-040332 | 2/2011 |
| JP | 2012059500 A * | 3/2012 |
| JP | 2012-204109 | 10/2012 |
| JP | 2014-049235 | 3/2014 |
| JP | 2014-127229 | 7/2014 |
| JP | 2016009645 A * | 1/2016 |
| JP | 2016-091772 | 5/2016 |
| JP | 2016-100211 | 5/2016 |
| WO | 2011/021614 | 2/2011 |
| WO | 2016/080212 | 5/2016 |

OTHER PUBLICATIONS

JP-2016009645-A English machine translation (Year: 2020).*
Official Communication issued in International Bureau of WIPO Patent Application No. PCT/JP2017/024655, dated Aug. 29, 2017.

* cited by examiner

TERMINAL FITTING AND WIRING MODULE USING SAME

TECHNICAL FIELD

The present invention relates to a terminal fitting suitable for connecting electrode terminals of electricity storage elements in an electric storage module for use with a vehicle, and a wiring module using the terminal fitting.

BACKGROUND ART

In an electric storage module for vehicles such as an electric car and a hybrid car, a plurality of electricity storage elements that have electrode terminals are arranged, and the electrode terminals of the adjacent electricity storage elements are connected by bolting a flat plate-shaped terminal fitting, thus connecting the plurality of electricity storage elements in series.

As a terminal fitting of this type, a terminal fitting formed as a single body with a wire connection portion for crimping a detection wire (hereinafter referred to as a "wire") that detects the voltage of the electricity storage elements is available. The wire that is connected to the wire connection portion is passed through a wire accommodating region (hereinafter referred to as an "accommodating region") provided above a group of the electricity storage elements, and is then drawn to the outside of the electric storage module.

Here, it is common that the above-described wire connection portion protrudes from a side edge of the plate surface of the terminal fitting so as to extend the plate surface, and that the wire is connected in a direction along the protruding direction of the terminal fitting.

When a terminal fitting including such a wire connection portion is disposed on the upper surface of an electricity storage element, the connected wire extends from the wire connection portion toward the accommodating region along the protruding direction thereof. After being led into the accommodating region, the wire is bent along its extending direction, and then extends along the bottom of the inside of the accommodating region to reach an end of the accommodating region, from where the wire is drawn to the outside of the electric storage module.

Meanwhile, as wires are sequentially accommodated in the accommodating region, the inside of the accommodating region is gradually filled with the wires, starting from the bottom. Eventually, for a terminal fitting in the vicinity of the end of the accommodating region, the space located on the extension of the protruding direction of the wire connection portion is closed by the wires that have been accommodated earlier. If a wire is led into this space, the wire is not only bent horizontally in the extending direction of the accommodating region as described previously, but also forcibly bent further in the vertical direction to the space of the interior of the accommodating region that is mainly left in the upper portion.

As a result, the operation of accommodating the wire into the accommodating region becomes difficult, and, moreover, excessive force may be exerted on the wire connection portion by the wire being forcibly bent both in the horizontal direction and the vertical direction. Accordingly, in the case of using such a terminal fitting, the accommodating region needs to be provided at an appropriate distance from the end of the wire connection portion, taking into consideration the allowable bending radius of the wire at least in the horizontal direction.

However, with the recent miniaturization of electricity storage elements, the available upper surface area has been decreased, and it is not necessarily possible to provide the accommodating region at a sufficient distance from the end of the wire connection portion.

As one solution for this problem, a terminal fitting as described in Patent Document 1, for example, is available in which the wires are connected so as to be held parallel to the direction of arrangement of the electricity storage elements, thus eliminating the need to bend the wires in the extending direction of the accommodating region (i.e., in the horizontal direction).

CITATION LIST

Patent Documents

Patent Document 1: Japanese Patent No. 5780788 (FIG. 3).

SUMMARY OF INVENTION

Technical Problem

However, even when this terminal fitting is used, at the end of the accommodating region, the wires are forcibly raised and pushed into the space left in the upper portion of the accommodating region as described above, and, therefore, the forcible upward bending cannot be reduced. Accordingly, the problem of the influence on the wire connection portion still remains.

The present invention has been completed in view of the above-described circumstances, and it is an object of the present invention to allow the wire accommodating region to be disposed close to the terminal fitting, while suppressing the influence on the wire connection portion.

Solution to Problem

A feature of the terminal fitting according to the present invention lies in a terminal fitting for connecting, in an electric storage module including a plurality of electricity storage elements, a wire to an electrode terminal of each of the electricity storage elements, the terminal fitting including: a plate-shaped terminal connection portion that is to be connected to the electrode terminal; an extending portion extending integrally from an edge portion of the terminal connection portion; and a wire connection portion for connecting the wire, the wire connection portion being provided on a distal end side of the extending portion, wherein the extending portion is inclined to be higher toward a distal end such that a side thereof on the wire connection portion is raised relative to a plate surface of the terminal connection portion.

With the above-described configuration, the wire connection portion side of the extending portion is raised relative to the plate surface of the terminal connection portion. Therefore, it is possible to reduce the projected dimension of the extending portion itself on the upper surface of each of the electricity storage elements, making it possible to dispose the wire accommodating region closer to the terminal fitting accordingly. Furthermore, the wire is raised by the extending portion, and is led to a higher position in the wire accommodating region, and it is thus possible to reduce the upward bending of the wire.

The following configurations are preferable as embodiments of the terminal fitting according to the present invention.

(1) The terminal connection portion includes a conductive metal plate that is in a folded state, and has a pair of screw through holes for passing therethrough screw portions for connecting the electrode terminals of adjacent ones of the electricity storage elements, and the wire connection portion is formed by bending the conductive metal plate.

(2) The extending portion extends from a lowermost layer of the conductive metal plate constituting the terminal connection portion.

With this configuration, it is possible to connect the electrode terminals of adjacent ones of the electricity storage elements by the terminal connection portion, and also connect the electrode terminals and the wire. Moreover, the terminal connection portion and the wire connection portion are formed by bending a conductive metal plate, and, therefore, the number of components can be decreased.

(3) The terminal connection portion is formed of a conductive metal plate that is separate from a bus bar terminal that connects the electrode terminals of the plurality of electricity storage elements, and is stacked on the bus bar terminal and connected to the electrode terminal.

With this configuration, the terminal connection portion is formed of a conductive metal plate that is separate from the bus bar terminal, and it is thus possible to use a conductive metal plate suitable for forming the extending portion to be inclined to be higher toward a distal end.

(4) The wire connection portion includes an insulation barrel to which an insulating covering of the wire is to be attached through caulking and a wire barrel to which a core wire of the wire is to be attached through caulking, and the insulation barrel and the wire barrel are caulked while holding the wire on an upper surface side of the wire connection portion.

An aspect of the present invention may be directed to a wiring module for an electric storage module, the wiring module including: a plurality of the above-described terminal fittings; a plurality of wires connected to the respective wire connection portions of the terminal fittings; and an accommodating member configured to accommodate the plurality of wires in a direction of arrangement of the electricity storage elements.

The following configurations are preferable as embodiments of the wiring module according to the present invention.

(1) The accommodating member includes a cylindrical accommodating portion disposed extending in a direction of arrangement of the electricity storage elements, and the accommodating portion has a slit formed on a side surface thereof along a length direction thereof.

This configuration allows the slit to be passed through at any position of the accommodating portion in the length direction when leading the wire into the accommodating portion. It is possible to lead the wire into the wire accommodating portion, while starting to bend the wire so as to extend along length direction of the accommodating portion from the outside of the wire accommodating portion. Accordingly, it is possible to have a larger bending radius than when the wire is bent only inside the accommodating portion.

(2) The wire connected to the wire connection portion of each of the terminal fittings is provided extending toward an axis of the accommodating portion through the slit.

With this configuration, the wire that has been connected to the wire connection portion of each of the terminal fittings is led to the vicinity of the axis portion of the wire accommodating portion. Accordingly, even when a wire is further led after a plurality of wires have been accommodated, the wire can be disposed so as to be uniformly released in an empty space around the axis portion. Accordingly, the bending load can be made uniform across the wires as a whole. In addition, the wires that have been already accommodated can be easily displaced. Therefore, a new wire can be easily disposed at the axis portion while the already accommodated wires are being forced to the outer side. This increases the degree of freedom of wire arrangement in the wire accommodating portion.

(3) The accommodating member includes an accommodating portion disposed extending in a direction of arrangement of the electricity storage elements, and the accommodating portion has a slit formed on a side surface thereof in a length direction thereof along a direction in which the terminal connection portion is raised.

This configuration allows a shift of the position at which the wire passes through the slit in the raised direction of the terminal connection portion when leading the wire into the accommodating portion. Accordingly, in comparison to a case where the slit is formed along the length direction of the accommodating portion, the operability for accommodation into the accommodating member is improved because the heights of the plurality of wires extending from the distal end of the terminal connection portion do not need to be adjusted to the same height in the raised direction of the terminal connection portion.

Another aspect of the present invention may be directed to a wire-equipped terminal fitting for connecting electrode terminals of an electricity storage element in a vehicle electric storage module, the terminal fitting including a terminal connection portion for connecting to the electrode terminals of the electricity storage element; and a wire connection portion extending from the terminal connection portion so as to crimp the wire, and wherein a plate surface of the terminal connection portion and a direction of extension of the wire connection portion forms an angle that is larger than 0° and smaller than 90°.

Advantageous Effects of Invention

According to the present invention, it is possible to dispose the wire accommodating region close to the terminal fitting, while suppressing the influence on the wire connection portion.

DESCRIPTION OF EMBODIMENTS

Embodiment 1

Embodiment 1 will be described with reference to FIGS. 1 to 8.

A wiring module 10 of the present embodiment is mounted to an electric storage module 5. The electric storage module 5 is mounted, for example, to a vehicle such as an electric car or a hybrid car, and is used as a power supply.

Figure 1:
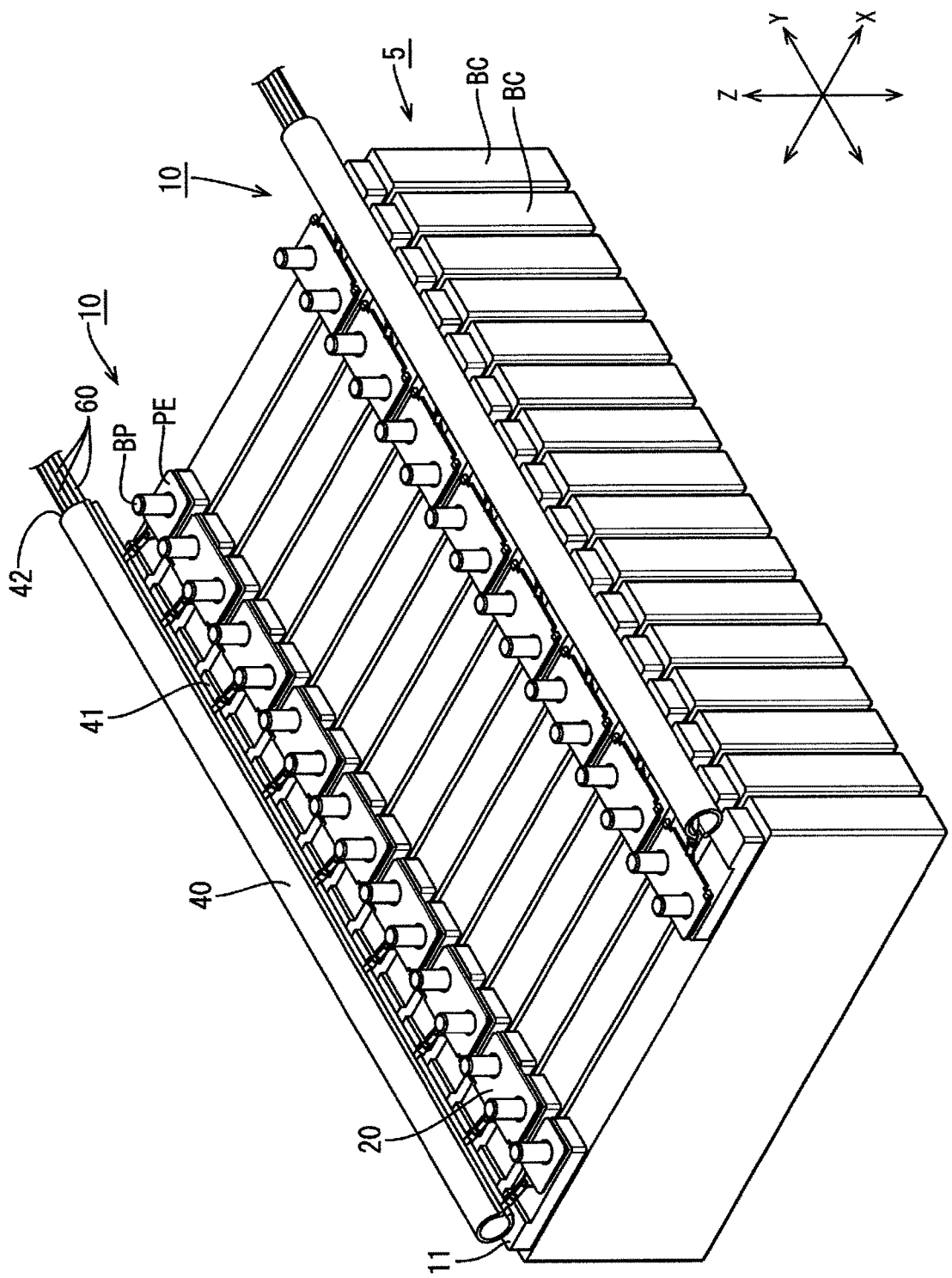
FIG. 1 is a perspective view showing an electric storage module including a wiring module according to Embodiment 1.

The electric storage module 5 includes a plurality of electricity storage elements BC that are arranged in a row in the Y-axis direction in FIG. 1, and the wiring module 10 is attached to the upper surfaces of the electricity storage elements BC. Each of the electricity storage elements BC has a flat, rectangular solid-shaped body portion in which an electricity storage element is accommodated, and includes a bolt-shaped electrode terminal BP protruding from a pedestal portion PE provided above the body portion. A placement portion 11 on which a wire accommodating tube 40, which will be described below, is placed, is provided on a portion of the upper surface of each electricity storage element BC so as to be raised from the upper surface, the portion being located outward of the pedestal portion PE in a direction (the X-axis direction) orthogonal to the direction of arrangement of the electricity storage elements BC.

As shown in FIG. 1, the wiring module 10 includes a plurality of bus bar terminals 20 (an example of the terminal fitting), a plurality of wires 60 respectively connected to the bus bar terminals 20, and a wire accommodating tube 40, which is an accommodating member that accommodates the wires 60.

Figure 2:
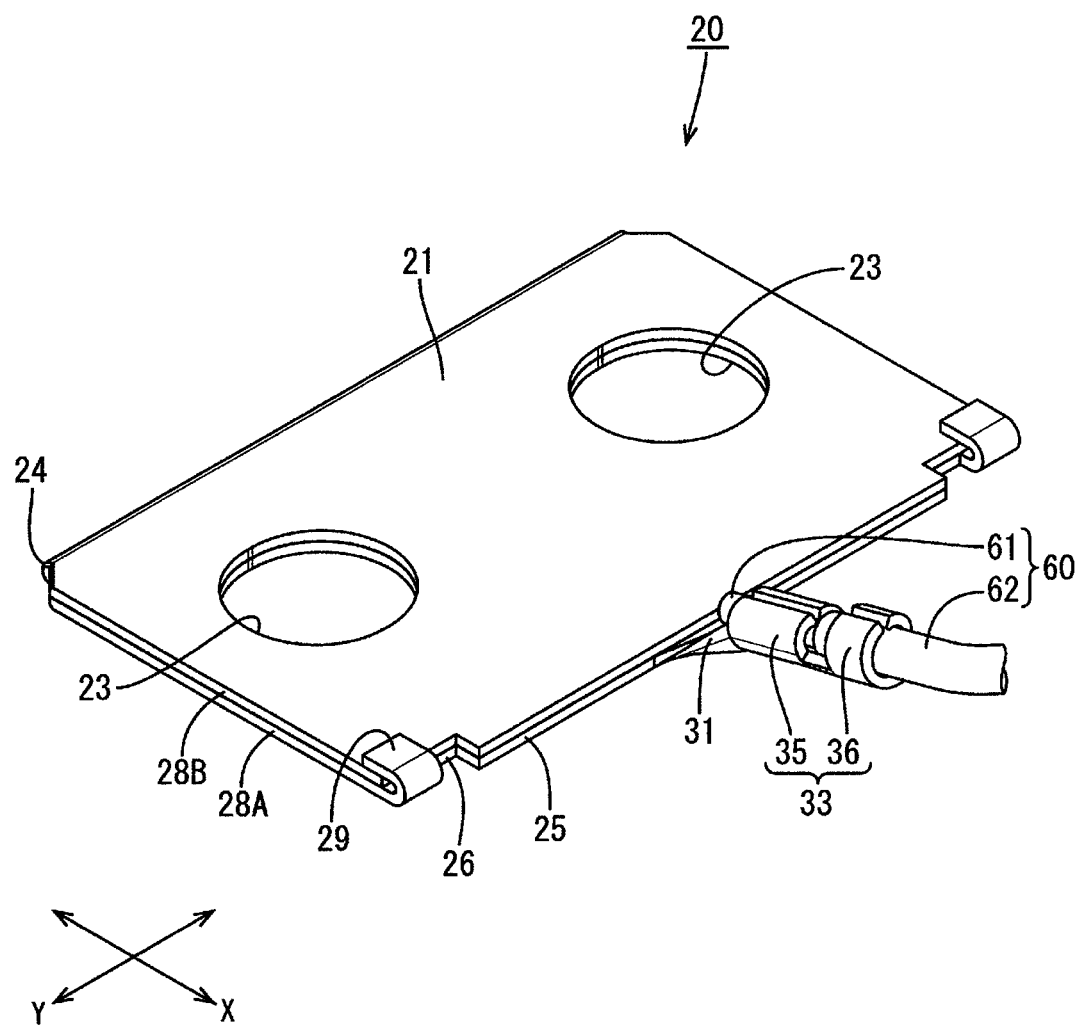
FIG. 2 is a perspective view showing a terminal fitting-equipped wire.

For example, the bus bar terminal 20 is formed of a plate of a conductive metal such as copper, a copper alloy, aluminum, an aluminum alloy, and stainless steel (SUS), and includes, as shown in FIG. 2, a terminal connection portion 21 that is connected to the respective electrode terminals BP of two adjacent electricity storage elements BC, an extending portion 31 that is formed as a single body with the terminal connection portion 21, and a wire connection portion 33 that is formed as a single body with a distal end of the extending portion 31 and to which an end of the wire 60 is connected.

The terminal connection portion 21 has a plate surface having a substantially rectangular shape, and two screw through holes 23 formed along the Y-axis direction are provided in substantially the central portion in the X-axis direction shown in FIG. 2. The electrode terminals BP of the adjacent two electricity storage elements BC can be passed through the screw through holes 23, respectively.

The terminal connection portion 21 is formed by bending a conductive metal plate having a small thickness such that flat plate portions 28A and 28B are stacked via a hinge portion 24. Rectangular cut-out portions 26 that are located on the opposite side from the hinge portion 24 and extend along the Y-axis direction are formed at both ends of a side edge portion 25 of the flat plate portion 28B. Also, a pair of holding pieces 29 are provided at both end portions of a side edge portion 25 of the flat plate portion 28B located on the lower layer side of the flat plate portion 28A. By folding the holding piece 29 in a U-shape so as to be engaged with the flat plate portion 28B, the flat plate portions 28A and 28B are held in the state of a vertical two-layer stack.

Note that the reason that the terminal connection portion 21 is configured as a folded structure in which two flat plate portions 28A and 28B are stacked is as follows: The terminal connection portion 21 needs to have a relatively small plate thickness in order for the wire connection portion 33 to which the wire 60 is crimped to be provided as a single body with the terminal connection portion 21, while enabling the crimping, as will be described below, whereas, on the other hand, it is necessary to reduce the electrical resistance of the terminal connection portion 21.

The extending portion 31 is connected as a single body with the flat plate portion 28A located on the lower layer side, and protrudes from the side edge portion 25 along a direction orthogonal thereto, and the wire connection portion 33 is provided on the distal end side thereof. The wire connection portion 33 includes a wire barrel 35 that is formed as a single body with the extending portion 31 on the distal end side thereof, and an insulation barrel 36 that is formed as a single body with the wire barrel 35 on the distal end thereof.

Figure 3:
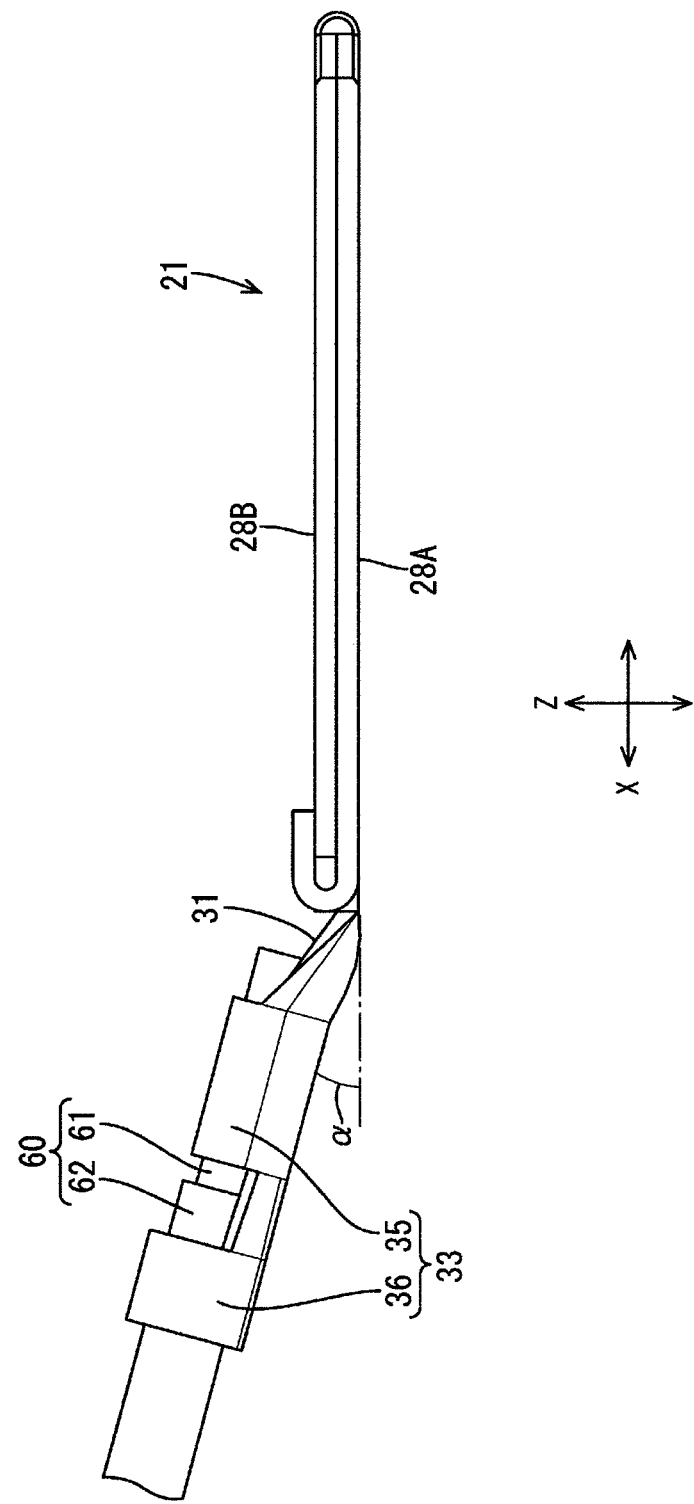
FIG. 3 is a cross-sectional view showing the terminal fitting-equipped wire.

Also, as shown in FIG. 3, the extending portion 31 is shaped to be inclined to be higher toward a distal end relative to the plate surface of the terminal connection portion 21 on the wire connection portion 33 side. In the present embodiment, the angle α formed between the extension plane of the plate surface of the terminal connection portion 21 and the extending portion 31 (and the wire connection portion 33 extending therealong) is about 15°.

To connect a wire 60 to the wire connection portion 33, a conductor portion 61 that is exposed by removing the insulating covering 62 is crimped to the wire barrel 35 through caulking, and an insulating covering 62 is crimped to the insulation barrel 36 through caulking, as shown in FIG. 3. In this case, the insulation barrel 36 and the wire barrel 35 are caulked while holding the wire 60 on the upper surface side of the wire connection portion 33.

Figure 4:
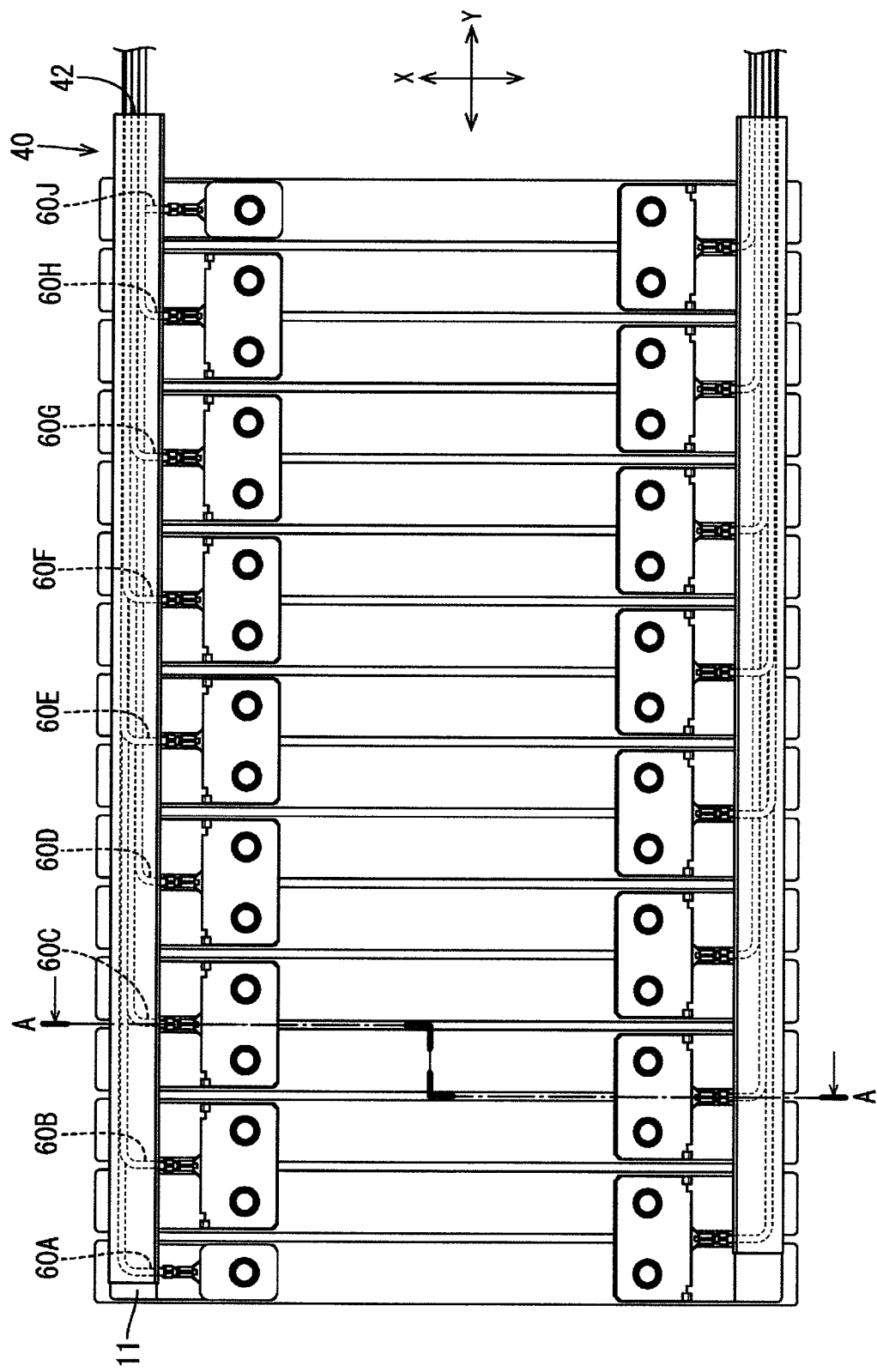
FIG. 4 is a plan view of the electric storage module including the wiring module.

As shown in FIGS. 1 and 4, the wire accommodating tube 40 is a cylindrical hollow member that is opened at an end portion, and a slit 41 through which the wires 60 are passed is opened in the side surface extending in the length direction thereof. The wire accommodating tube 40 is disposed on the upper surfaces of the electricity storage elements BC such that its axial direction extends along the direction of arrangement of (the Y-axis direction) of the electricity storage elements BC, and that an extension of the axis of the wire connection portion 33 passes the vicinity of the axis of the wire accommodating tube 40 through the slit 41. Consequently, the plurality of wires 60 connected to the respective wire connection portions 33 are led to the vicinity of the axis of the wire accommodating tube 40 through the slit 41, and are further bent inside the wire accommodating tube 40 so as to extend along the length direction thereof.

Figure 5:
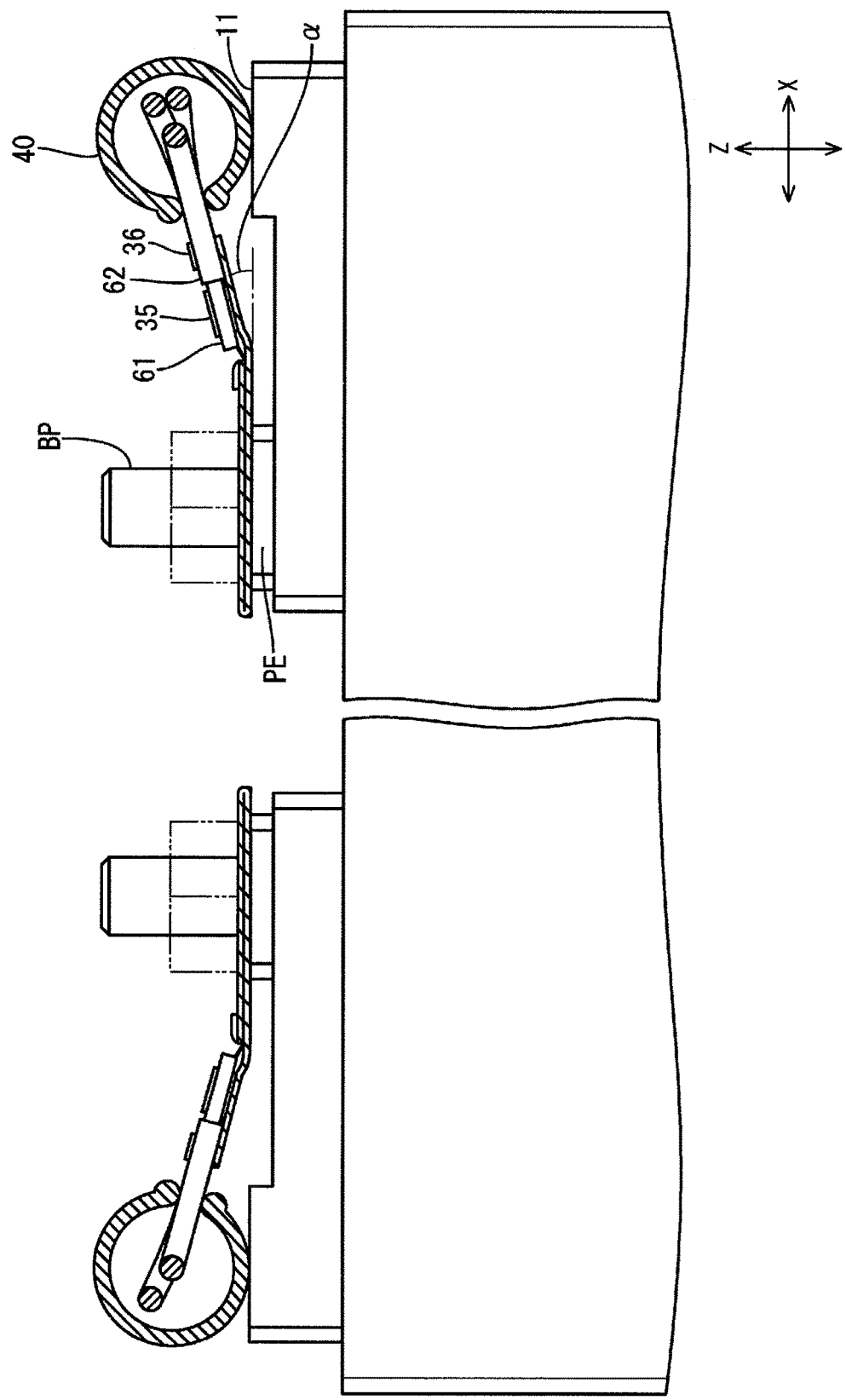
FIG. 5 is a cross-sectional view taken along the line A-A in FIG. 4.

The wiring module 10 configured in this manner is fixed onto the electricity storage elements BC by passing the electrode terminals BP of adjacent electricity storage elements BC through the pair of screw through holes 23 for each of the bus bar terminals 20 as shown in FIG. 5, placing the electrode terminals BP on the pedestal portion PE, and fastening nuts from above as indicated by the dashed double-dotted line in FIG. 5. The wire accommodating tube 40 is placed on the upper surface of the placement portion 11 provided on the upper surface of each of the electricity storage elements BC. The group of the wires 60 extended to the outside from the opening 42 of the wire accommodating tube 40 is connected to an external ECU (electronic control unit), which is not shown. Note that the ECU includes a microcomputer, an element, and the like that are mounted thereon, and has a well-known configuration having the functions for performing, for example, detection of the voltage, the current, the temperature, and the like of the electricity storage element BC, and charge/discharge control for the electricity storage element BC.

In the wiring module 10 of the present embodiment, the extending portion 31 and the wire connection portion 33 are shaped to be inclined to be higher toward a distal end such that the distal end side thereof is raised relative to the plate surface of the terminal connection portion 21. Therefore, it is possible to reduce the projected dimension on the upper surface of each electricity storage element BC in comparison to a case where they are parallel to the plate surface of the terminal connection portion 21, and, therefore, it is possible to dispose the wire accommodating tube 40 closer to the bus bar terminal 20 accordingly.

Note that in the present embodiment, the slit 41 of the wire accommodating tube 40 is opened along the length direction (the Y-axis direction) thereof, and it is therefore possible to lead a wire into the wire accommodating tube 40, while starting the wire to be bent so as to extend along the Y-axis direction from the wire accommodating tube 40.

In the wiring module 10 of the present embodiment, the wire 60 extending from the wire connection portion 33 provided to be inclined to be higher toward a distal end from the terminal connection portion 21 is led to the vicinity of the axis portion of the wire accommodating tube 40. Therefore, the wire 60 that is led after the plurality of wires 60 have been accommodated can be disposed so as to be uniformly released in an empty space around the axis portion. Accordingly, the bending load can be made uniform among the wires 60 as a whole. In addition, the wires 60 that have been already accommodated can be easily displaced. Therefore, for example, in the vicinity of the opening 42 of the wire accommodating tube 40 where the empty space is smallest, the last wire (a wire 60J in FIG. 6) can be easily disposed at the central portion while the already accommodated wires (the wires 60A to 60H in FIG. 6) are being forced to the outer side. This increases the degree of freedom of wire arrangement in the wire accommodating portion.

Figure 7:
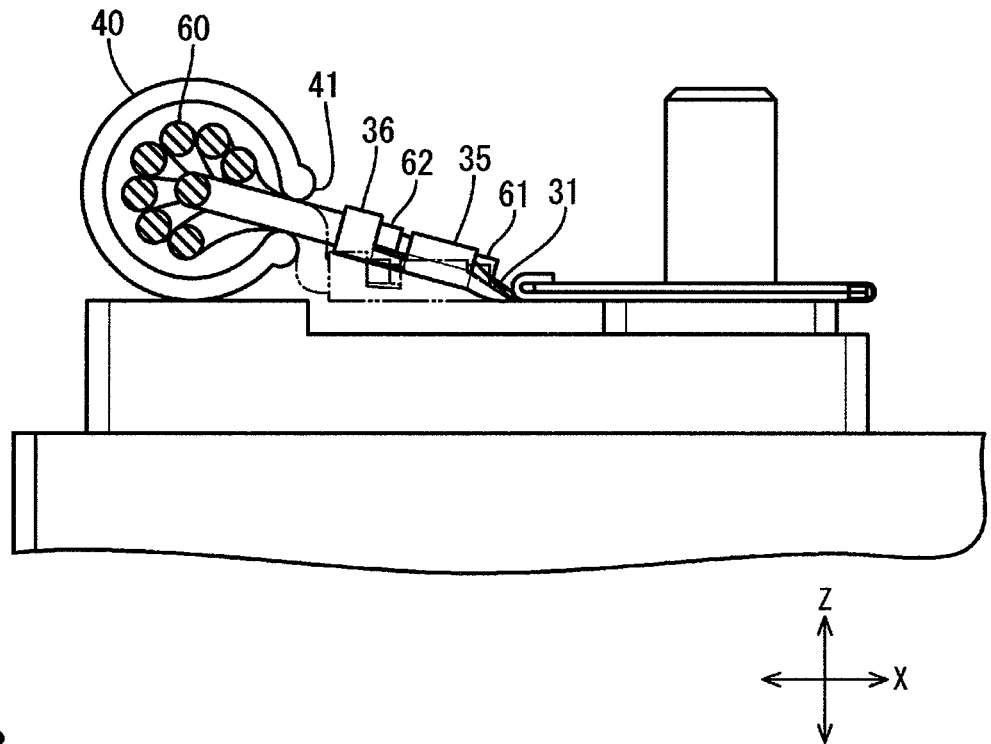
FIG. 7 is a partially cut-away side view of the electric storage module shown in FIG. 6.

If the extending portion 31 is configured to extend from the terminal connection portion 21 so as to be parallel to the plate surface thereof, due to the height difference between the slit 41 and the wire connection portion 33, the wire between the wire connection portion 33 and the slit 41 is forcibly bent when attaching the wiring module 10 to the electric storage module 5 as illustrated by the dashed double-dotted line in FIG. 7. Accordingly, the load tends to be exerted on the wire connection portion 33, which has a relatively small plate thickness. In contrast, in the wiring module 10 of the present embodiment, the extending portion 31 forms an angle with the plate surface of the terminal connection portion 21. Accordingly, the lower surface of the terminal connection portion 21 extends along the upper surface of the pedestal portion PE without forcibly bending the wire 60, and it is thus possible to prevent the load from being exerted on the wire connection portion 33.

As such, with the wiring module 10 of the present embodiment, it is possible to suppress the bending of the wire 60 that could cause influence on the wire connection portion 33, while disposing the wire accommodating portion close to the bus bar terminal 20.

Figure 6:
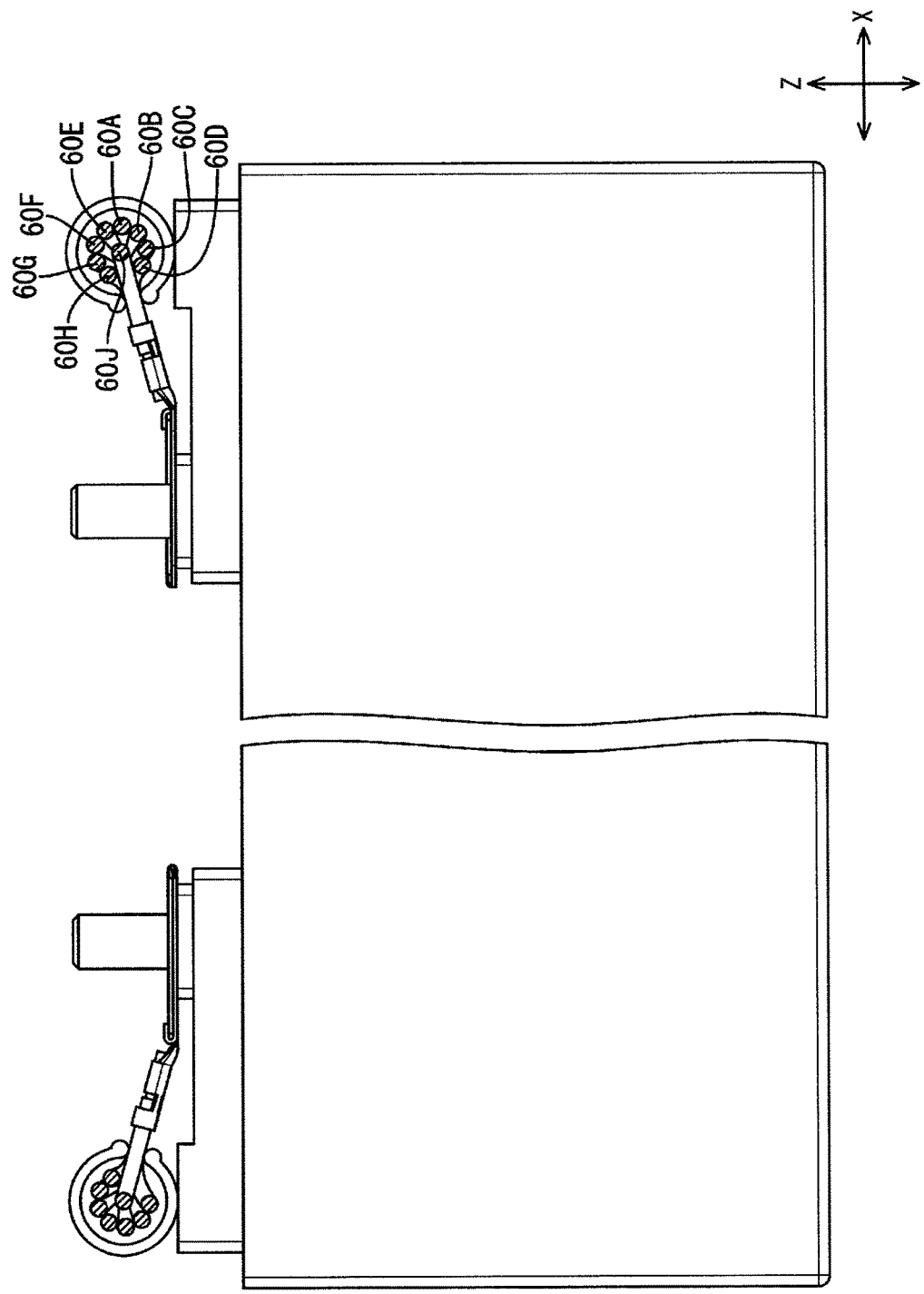
FIG. 6 is a partially cut-away enlarged view of the electric storage module including the wiring module.

Note that the arrangement of the wires 60A to 60J in FIGS. 4 to 6 schematically shows the relationship between the escaping positions of the wires. When performing the operation of accommodating wires into the wire accommodating portion, the wires 60 can be disposed and accommodated freely by an operator, taking the above-described arrangement as an example.

Modifications

The present invention is not limited to Embodiment 1 described by the above statements and drawings, and, for example, the following modifications also fall within the technical scope of the present invention.

(1) In the above embodiment, the angle α formed between the extension plane of the plate surface of the terminal connection portion 21 and the extending portion 31 (and the wire connection portion 33 extending therealong) is 15°; however, the angle α is not limited thereto, and may be any angle from 0° to 90°. Simply put, the angle α may be any angle that allows the wire 60 extending from the wire connection portion 33 to be attached to the pedestal portion PE of the electricity storage element BC without being forcibly bent.

Figure 8:
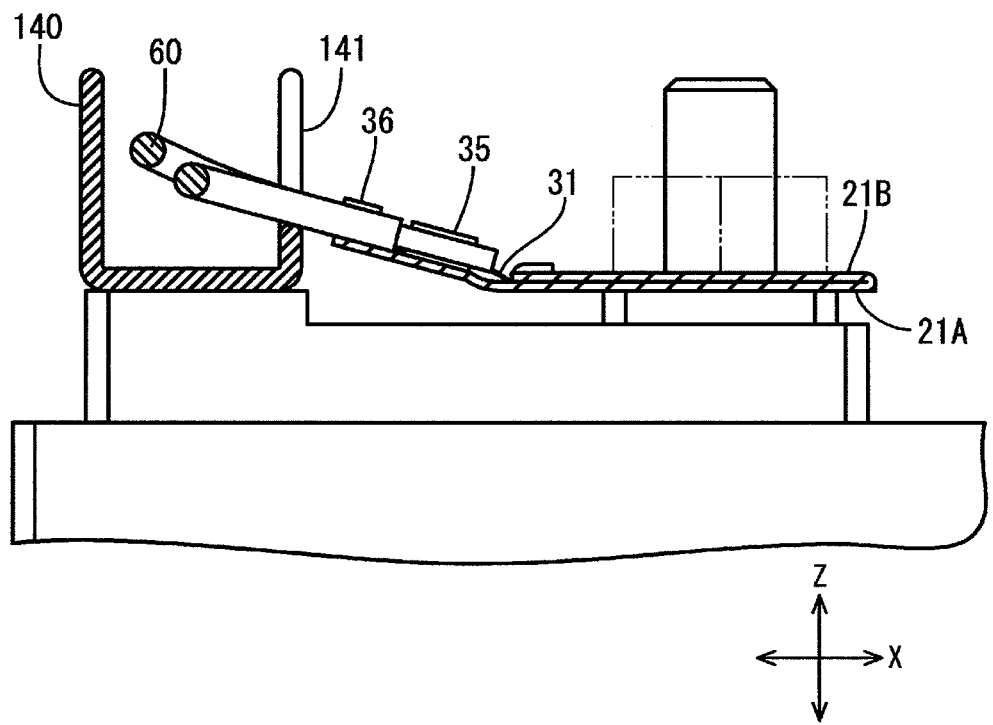
FIG. 8 is a partially cut-away enlarged view of an electric storage module according to a modification.

(2) In the above embodiment, the wire accommodating portion is a cylindrical hollow member 40; however, the wire accommodating portion is not limited thereto, and may be, for example, a wire accommodating trough 140 configured as a rectangular solid-shaped hollow member that is opened at the top as shown in FIG. 8.

In the above embodiment, the slit 41 that is opened along the length direction of the wire accommodating portion is used; however, the present invention is not limited thereto, and a slit 141 that is opened along the direction in which the terminal connection portion 21, which includes first portion 21A and second portion 21B, is raised as shown in FIG. 8 may be used, for example.

Embodiment 2

Figure 9:
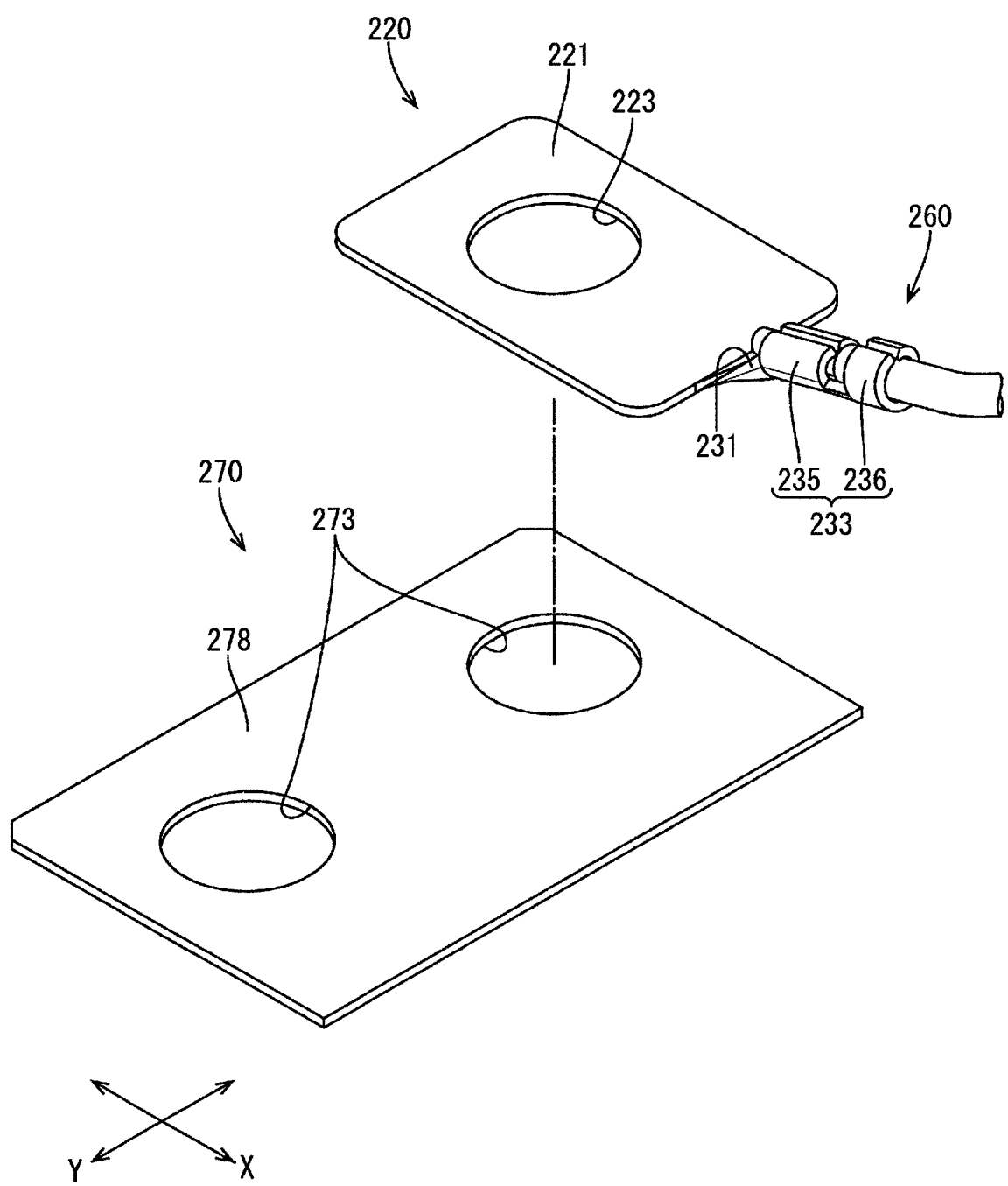
FIG. 9 is a perspective view of a bus bar terminal and a terminal fitting-equipped wire according to Embodiment 2.
Figure 10:
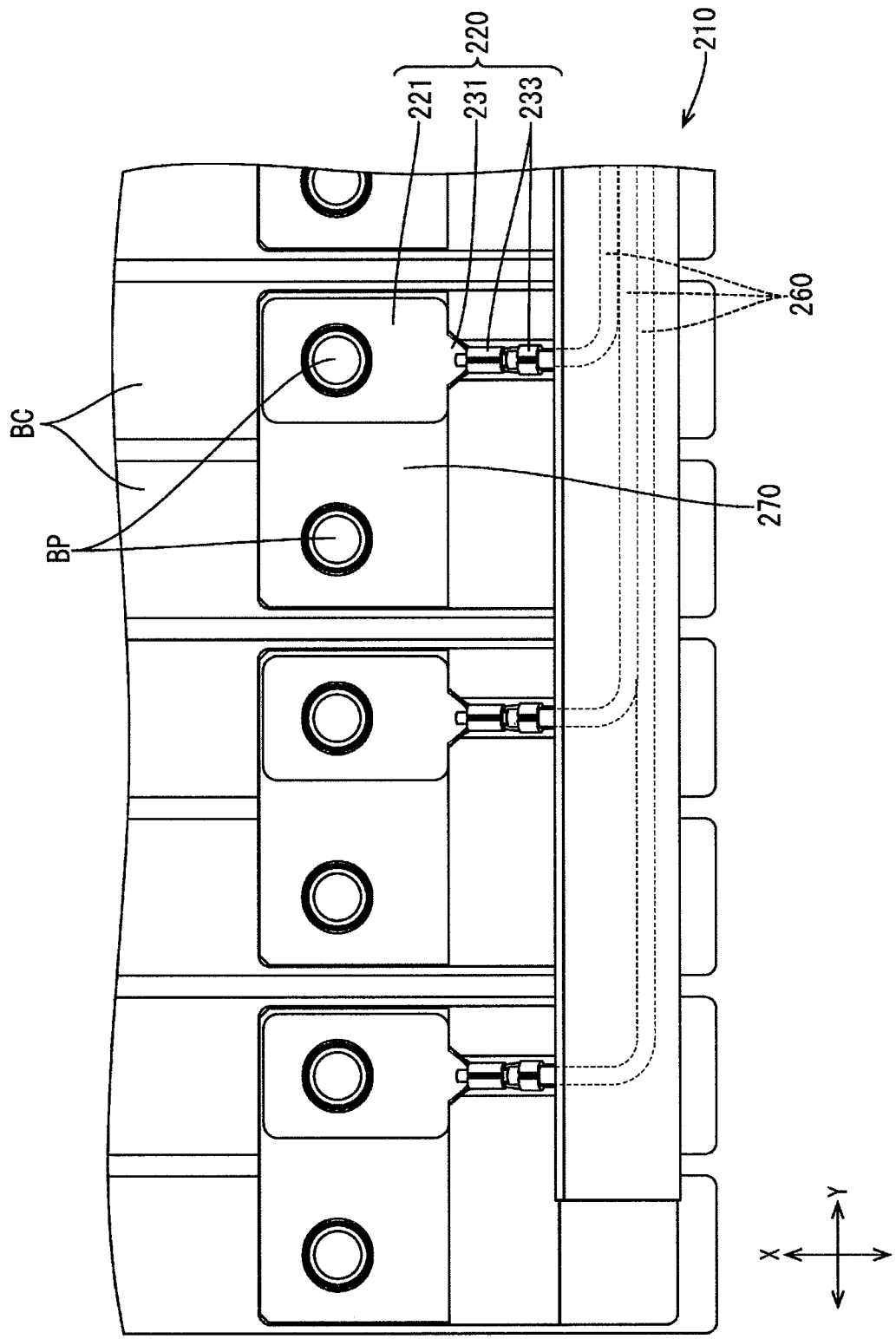
FIG. 10 is a plan view of an electric storage module according to Embodiment 2.

Next, Embodiment 2 will be described with reference to FIGS. 9 and 10.

A wiring module 210 according to the present embodiment includes, in place of the bus bar 20 of Embodiment 1, a bus bar terminal 270 and a detection terminal 220 (an example of the terminal fitting) that is separate from the bus bar terminal 270.

The bus bar terminal 270 includes a sheet of an inter-electrode connection portion 278 that is formed of a thick conductive metal plate. The inter-electrode connection portion 278 has two insertion holes 273 formed along the Y-axis direction. The respective electrode terminals BP of the two electricity storage elements BC are passed through the insertion holes 273. Consequently, the bus bar terminal 270 is fixed to the two electrode terminals BP, thus electrically connecting the two electrodes BP.

Note that the insertion holes 273 need not necessarily be provided, and, for example, it is possible to omit the insertion holes, and connect the bus bar terminal to the electrode terminals through welding.

The detection terminal 220 is formed of a conductive metal plate having a small thickness, and includes a terminal connection portion 221, an extending portion 231, and a wire connection portion 233 that are formed as one piece.

The terminal connection portion 221 has a substantially rectangular, flat plate shape, and its dimensions are slightly smaller than the bus bar terminal 270 in the X-axis direction, and is about ½ the bus bar terminal 270 in the Y-axis direction. The terminal connection portion 221 has a screw through hole 223 having the same shape as the insertion hole 273 of the bus bar terminal 270. The terminal connection portion 221 is stacked on and fixed to the bus bar terminal 270 in a state in which one of the electrode terminals BP is passed through the screw through hole 223.

The extending portion 231 and the wire connection portion 233 are punched from a conductive metal plate integrally together with the terminal connection portion 221. The extending portion 231 protrudes so as to be inclined to be higher toward a distal end, from the center of the side edge of the terminal connection portion 221 along a direction orthogonal thereto. The wire connection portion 233, which includes a wire barrel 235 and an insulation barrel 236, is provided on the distal end side of the extending portion 231, and a wire 260 is crimped to the wire connection portion 233 through caulking. Consequently, the detection terminal 220 electrically connects the wire 260 between the electrodes BP via the bus bar terminal 270.

Note that the screw through hole 223 need not necessarily be provided, and it is possible to, for example, omit the screw through hole, and connect the terminal connection portion 221 to the bus bar terminal 270 through brazing, soldering, or welding. Note that the other components of the present embodiment are the same as those of Embodiment 1, and the description thereof thus has been omitted.

With the configuration of the present embodiment, the extending portion 231 and the wire connection portion 233 are provided in the detection terminal 220 that is separate from the bus bar terminal 270. Accordingly, the detection terminal 220 can be formed of a conductive metal plate material having an appropriate plate thickness according, for example, to the desired angle of the shape inclined to be higher toward a distal end for the extending portion 231. Furthermore, the shape inclined to be higher toward a distal end of the extending portion 231 can be formed in advance, and it is therefore not necessary to adjust the extending angle of the wire 260 by forcibly deforming the extending portion 231 and hence the detection terminal 220 as a whole after fixing the detection terminal 220 to the bus bar terminal 270. Accordingly, the state of connection of the detection terminal 220 with the bus bar terminal 270 can be suitably maintained.

LIST OF REFERENCE NUMERALS

5 Electric storage module
BC Electricity storage element
BP Electrode terminal
PE Pedestal portion
10 Wiring module
20 Bus bar terminal (terminal fitting)
21 Terminal connection portion
23 Screw through hole
24 Hinge portion
25 Side edge portion
28A, 28B Flat plate portions
31 Extending portion
33 Wire connection portion
35 Wire barrel
36 Insulation barrel
40 Wire accommodating tube (accommodating member)
140 Wire accommodating trough (accommodating member)
41 Slit
42 Opening
60 (60A to 60J) Wire
61 Conductor portion
62 Insulating covering
220 Detection terminal (terminal fitting)
221 Terminal connection portion
270 Bus bar terminal

What is claimed is:

1. A terminal fitting for connecting, in an electric storage module including a plurality of electricity storage elements, a wire to an electrode terminal of each of the electricity storage elements, the terminal fitting comprising:
   a plate-shaped terminal connection portion configured to be connected to the electrode terminal;
   an extending structure extending integrally from an edge portion of the terminal connection portion; and
   a wire connection portion to connect the wire, the wire connection portion being provided on a distal end side of the extending structure,
   wherein the extending structure is inclined to be higher toward a distal end such that a side thereof on the wire connection portion is raised relative to a plate surface of the terminal connection portion, and
   the wire connection portion includes a tubular passage that has an axial direction, the axial direction of the tubular passage is inclined to rise higher above the plate surface of the terminal connection portion in a direction moving away from the terminal connection portion, and the wire connection portion guides the wire through the tubular passage in the axial direction of the tubular passage and toward the terminal connection portion.

2. The terminal fitting according to claim 1, wherein the terminal connection portion includes a folded conductive metal plate having a pair of screw through holes to pass therethrough screw portions to connect the electrode terminals of adjacent ones of the electricity storage elements, and the wire connection portion is formed by bending the conductive metal plate.

3. The terminal fitting according to claim 2, wherein the extending structure extends from a lowermost layer of the conductive metal plate constituting the terminal connection portion.

4. The terminal fitting according to claim 1, wherein the terminal connection portion is formed of a conductive metal plate that is separate from a bus bar terminal that connects the electrode terminals of the plurality of electricity storage elements, and is stacked on the bus bar terminal and connected to the electrode terminal.

5. The terminal fitting according to claim 1, wherein the wire connection portion includes an insulation barrel to which an insulating covering of the wire is to be attached through caulking and a wire barrel to which a core wire of the wire is to be attached through caulking, and the insulation barrel and the wire barrel are caulked while the wire is held on an upper surface side of the wire connection portion.

6. A wiring module for an electric storage module, the wiring module comprising:
   a plurality of the terminal fittings according to claim 1;
   a plurality of wires connected to the respective wire connection portions of the terminal fittings; and
   an accommodating structure configured to accommodate the plurality of wires in a direction of arrangement of the electricity storage elements.

7. The wiring module according to claim 6, wherein the accommodating structure includes a cylindrical accommodating portion disposed extending in the direction of arrangement of the electricity storage elements, and the accommodating structure has a slit formed on a side surface thereof along a length direction thereof.

8. The wiring module according to claim 7, wherein the wire connected to the wire connection portion of each of the terminal fittings extends toward an axis of the accommodating portion through the slit.

9. The wiring module according to claim 6, wherein the accommodating structure includes an accommodating portion disposed extending in the direction of arrangement of the electricity storage elements, and the accommodating portion has a slit formed on a side surface thereof in a length direction thereof along a direction in which the extending structure is raised.

10. A wire-equipped terminal fitting for connecting electrode terminals of an electricity storage element in a vehicle electric storage module, the terminal fitting comprising:

a terminal connection portion to connect to the electrode terminals of the electricity storage element; and a wire connection portion extending from the terminal connection portion so as to crimp a wire, wherein a plate surface of the terminal connection portion and a direction of extension of the wire connection portion forms an angle that is larger than 0° and smaller than 90°, and the wire connection portion includes a tubular passage that has an axial direction, the axial direction of the tubular passage is inclined to rise higher above the plate surface of the terminal connection portion in a direction moving away from the terminal connection portion, and the wire connection portion guides the wire through the tubular passage in the axial direction of the tubular passage and toward the terminal connection portion.

* * * * *